Patented Feb. 22, 1949

2,462,412

UNITED STATES PATENT OFFICE 2,462,412

VINYLIDENE CHLORIDE COMPOSITIONS STABLE TO LIGHT

Lorne A. Matheson and Raymond F. Boyer, Midland, Mich., assignors to The Dow Chemical Company, Midland, Mich., a corporation of Delaware No Drawing. Application May 28, 1945,
Serial No. 596,403

4 Claims. (Cl. 260—92.5)

The present invention relates to compositions of matter comprising polymeric vinylidene chloride products and certain specific addition agents to serve as light stabilizers for the vinylidene chloride polymer.

The polymer of vinylidene chloride alone and copolymers of this material with other polymerizable substances have been described in many patents and printed publications during the past several years. The polymer of vinylidene chloride alone and its copolymers and plasticized compositions are herein referred to as "polymeric vinylidene chloride products." These products, or most of them, are capable of being molded or extruded to form useful articles under the combined effects of heat and pressure. Some of them exhibit sufficient solubility in organic solvents to permit their being cast as films. In most cases, the articles produced, either by molding, extrusion or by casting from solution of polymeric vinylidene chloride products, are subject to decomposition when exposed for prolonged periods to the effects of light, especially when the articles have thin section and more particularly when such thin articles are subjected to light having a high concentration of ultraviolet radiations. Because of this apparent shortcoming of articles produced from polymeric vinylidene chloride products, much attention has been paid to the provision of stabilizers for these products to prevent or to minimize the darkening effect which has been obtained when the products have been exposed to light.

It is among the objects of the present invention to provide compositions of matter comprising a polymeric vinylidene chloride product stabilized against the darkening and embrittling effects of light. A related object is to provide a stabilizer which is satisfactory for use in lacquers and similar coating compositions containing a polymeric vinylidene chloride product as the film-forming portion of the coating composition. Other and related objects may appear hereinafter.

We have now found that the foregoing and related objects may be attained through the incorporation of a tetrabromoethane in a polymeric vinylidene chloride product. There are two tetrabromoethanes, both of which have been found satisfactory for the present purpose. The symmetrical compound, commonly known as acetylene tetrabromide, is available in greater quantities than the unsymmetrical product and has been found to be somewhat better as a stabilizer.

Numerous other brominated organic compounds have been tested to determine their applicability as stabilizers for polymeric vinylidene chloride products. Compositions containing many of them have shown some improvement over the untreated polymer but none have been found which are equal to or better than the tetrabromoethanes. Of several iodine compounds tested, none are as effective as the tetrabromoethanes. Among the miscellaneous bromine and iodine compounds which have been used for comparison with the tetrabromoethanes in vinylidene chloride compositions are bromoform; ethyl dibromide; 1,2-dibromo-1,1-dichloroethane; ethyl dibromoacetate; dibromobarbituric acid; butadiene sulfone dibromide; 2,3-dibromo-1-thio-3-cyclopentene-1,1-dioxide; tribromodiphenyloxide; dibromotetrachlorodiphenyloxide; tri-, tetra- and penta-bromo-mono-chlorodiphenyloxide; ethyl iodide; n-, iso- and tert.-butyl iodides; n- and tert.-amyl iodides; n-hexyl and n-heptyl iodides; iodoform, and the like, none of which gave results comparable with those obtained when using the tetrabromoethanes with which the present invention is concerned.

The new compositions may be readily prepared because the stabilizing agents employed are liquids with which the polymeric products may be mixed easily. The stabilizer may be added to soluble vinylidene chloride polymers by the simple expedient of mixing the stabilizer with a solution of the polymer. The insoluble polymeric vinylidene chloride products may advantageously be treated with the stabilizing agent by mixing the latter with the plasticizer to be used and introducing the modifying agent in the usual manner in a blending or compounding apparatus of the type common in the plastics art. In either case, when a uniform composition has been prepared, it is found that articles prepared from the composition are resistant to the darkening effects of prolonged exposure to light. It is to be understood that the methods which have been mentioned above are given only by way of illustration and that the new compositions may be prepared in any manner which will result in a uniform mixing of the polymer product and the tetrabromoethane.

The following examples illustrate the practice of the present invention:

EXAMPLE I

The polymeric product employed in the comparative tests set forth in the following table was a copolymer of about 85 per cent vinylidene chloride and correspondingly about 15 per cent of ethyl acrylate. This soluble copolymer is useful in the formation of liquid coating compositions for the protection of wood, cloth, paper, leather, metal or other surfaces. To 20 per cent solutions in dioxane of several samples of this copolymer was added the indicated percentage by weight of acetylene tetrabromide. Films were cast from the resulting solutions by spreading a portion of the solution on clean glass plates. The deposited films, when dry, were 0.004 inch thick. The dried films were exposed to a high concentration of ultraviolet radiations in a fadeometer for a period of 107 hours. An observation was made of the percent of the available visible light which was transmitted through the samples both before and after exposure in the fadeometer. The change in the amount of light transmitted gives an indication of the amount of darkening and, hence, of the extent of decomposition on exposure to light.

Table I

| Amount of Acetylene Tetrabromide, Per Cent | Per Cent Visible Light Transmitted Through Sample | |
|---|---|---|
| | Before Exposure | After Exposure |
| 0.3 | 91 | 77 |
| 1.0 | 91 | 1 79 |
| 3.0 | 91 | 1 80 |
| 5.0 | 91 | 83 |
| 10.0 | 91 | 83 |
| Blanks (average) | 91 | 38 |
| 3.0 Acetylene Tetra-Chloride (for comparison) | 92 | 51 |

1 Average.

EXAMPLE II

In a manner identical with that described above, 1,1,1,2-tetrabromoethane was added to solutions of the same copolymer and the so-modified composition was cast to form films which were tested in the manner described in Example I. The period of exposure in the fadeometer in this case was 75 hours. The results are reported below.

Table II

| Amount of 1,1,1,2-tetra-Bromoethane, Per Cent | Per Cent Visible Light Transmitted Through Sample | |
|---|---|---|
| | Before Exposure | After Exposure |
| 1.0 | 90 | 1 62 |
| 2.0 | 89 | 1 64 |
| 3.0 | 89 | 84 |
| Blanks (average) | 91 | 38 |

1 Average.

The invention has been illustrated with particular reference to the copolymer of vinylidene chloride and ethyl acrylate but is not limited to use in connection with this copolymer. It may be applied equally as effectively to copolymers of vinylidene chloride both of the soluble and insoluble types and whether or not such compositions will be exposed to fusion temperatures during their fabrication. Among the copolymers with which the tetrabromoethane may be advantageously combined, are those of vinylidene chloride with vinyl chloride, vinyl acetate, styrene, methyl methacrylate, vinyl cyanide and similar polymerizable substances. Thus, any vinylidene chloride copolymer which shows evidence of decomposition when exposed to light may be stabilized through the incorporation therein of a tetrabromoethane. For most purposes, 10 per cent of the tetrabromoethane is the maximum required for stabilizing while amounts under 0.25 per cent do not ordinarily afford a noticeable advantage. Practical concentrations for most uses are in the range of from 1 to 5 per cent, based on the weight of the polymeric vinylidene chloride product.

We claim:

1. A composition of matter comprising a polymeric vinylidene chloride product which is subject to darkening when exposed for prolonged periods to the effects of light and from 1 to 10 per cent of a tetrabromoethane selected from the group consisting of symmetrical and unsymmetrical tetrabromoethane, based on the weight of the polymer.

2. A composition of matter comprising a polymeric vinylidene chloride product which is subject to darkening when exposed for prolonged periods to the effects of light which is soluble in dioxane and from 1 to 10 per cent of a tetrabromoethane selected from the group consisting of symmetrical and unsymmetrical tetrabromoethane, based on the weight of the polymer.

3. A composition of matter as claimed in claim 1, wherein the tetrabromoethane is acetylene tetrabromide.

4. A composition of matter as claimed in claim 2, wherein the tetrabromoethane is 1,1,1,2-tetrabromoethane.

LORNE A. MATHESON.
RAYMOND F. BOYER.

No references cited.